United States Patent [19]
Okubo

[11] Patent Number: 5,924,534
[45] Date of Patent: Jul. 20, 1999

[54] CONTINUOUSLY VARIABLE TRANSMISSION

[75] Inventor: Masahiro Okubo, Kyoto, Japan

[73] Assignee: Exedy Corporation, Osaka, Japan

[21] Appl. No.: 08/834,839

[22] Filed: Apr. 10, 1997

[30] Foreign Application Priority Data

Apr. 10, 1996 [JP] Japan .................................. 8-112134

[51] Int. Cl.⁶ .................................................. F16H 47/00
[52] U.S. Cl. .................... 192/3.24; 192/3.25; 192/3.3; 60/333; 477/38
[58] Field of Search .............................. 192/3.23, 3.24, 192/3.3, 3.26, 3.27, 3.29; 60/331, 333, 345; 475/45; 477/38, 44, 52, 56, 57

[56] References Cited

U.S. PATENT DOCUMENTS

| | | | |
|---|---|---|---|
| 4,478,105 | 10/1984 | Yamamuro et al. | 477/38 X |
| 4,526,557 | 7/1985 | Tanaka et al. | 477/38 X |
| 4,660,440 | 4/1987 | Matsumura et al. | 477/38 |
| 4,768,632 | 9/1988 | Moan | 477/38 X |
| 4,790,216 | 12/1988 | Eggert et al. | 477/38 |
| 4,843,918 | 7/1989 | Morimoto | 477/38 |
| 4,846,765 | 7/1989 | Sakai | 477/38 X |
| 4,955,260 | 9/1990 | Oshidari | 477/38 X |
| 5,056,380 | 10/1991 | Sawasaki et al. | 477/38 X |
| 5,063,815 | 11/1991 | Oshidari | 477/38 |
| 5,095,776 | 3/1992 | Sato | 477/38 |
| 5,685,800 | 11/1997 | Toukura | 477/38 X |

*Primary Examiner*—Charles A. Marmor
*Assistant Examiner*—Saúl J. Rodriques
*Attorney, Agent, or Firm*—Pollock, Vande Sande & Amernick

[57] ABSTRACT

The invention provides a continuously variable transmission which is compact and high in operation efficiency, and allows smooth starting and smooth change-over between forward running and backward running. The continuously variable transmission includes a torque converter which in turn includes at least three runners of an impeller, a first turbine and a second turbine. The continuously variable transmission further includes a lock-up clutch operable to couple the impeller and the first turbine to each other, and a hydraulic brake disposed on a first turbine shaft connected to the first turbine and capable of being fixed to a housing. The second turbine is connected to a second turbine shaft connected to a pulley of a transmission via a one-way clutch which transmits a force only when the second turbine rotates in a direction reversed to the direction of rotation of the impeller. The continuously variable transmission further includes a hydraulic clutch operable to couple the first turbine shaft and the second turbine shaft to each other.

6 Claims, 4 Drawing Sheets

CONTINUOUSLY VARIABLE TRANSMISSION

BACKGROUND OF THE INVENTION

This invention relates to a continuously variable transmission, and more particularly to a compact continuously variable transmission which is combined with a fluid coupling to assure a good speed changing characteristic.

In a continuously variable transmission employed popularly, the speed change ratio cannot be set to infinity. Therefore, a continuously variable transmission for an automobile wherein an internal combustion engine is employed as a prime mover requires a coupling upon starting. Specific samples of these couplings include a fluid coupling and a torque converter which employ fluid, and a friction clutch which makes use of mechanical friction.

Meanwhile, a vehicle requires a mechanism for changing-over neutral, forward running and backward running states from each other since not only forward running but also backward running are required. Therefore, a counter gear or a planetary gear apparatus is used to perform the change-over by means of a clutch of the dog type or by means of a hydraulic clutch or a hydraulic brake. However, since gears for forward running and backward running are required, not only the axial length of the continuously variable transmission is increased by them, but also a high cost is required.

Thus, a continuously variable transmission has been also proposed, of a type which includes a torque converter which changes the direction of rotation of a belt to drive the vehicle to run forwardly or backwardly.

The torque converter includes a pump runner connected to an internal combustion engine side, a stator runner whose rotation is inhibited by a brake mechanism, and a turbine runner connected to a pulley side. In the torque converter, rotation of the stator runner is permitted or inhibited to rotate the turbine runner forwardly or backwardly to change the direction of rotation of the belt thereby to cause the vehicle to run forwardly or backwardly.

The structure of the torque converter of the type just described will be described in more detail below with reference to FIG. 5 which shows a torque converter for a continuously variable transmission disclosed in Japanese Patent Laid-Open Application No. Hei 2-159451.

The torque converter shown is generally denoted at 01 in FIG. 5. In the torque converter 01, driving torque of an internal combustion engine drives a pump 03 to rotate via a drive plate 02. A turbine 04 is connected to a shaft 05, which is disconnectably connected to the pump 03 by means of a direct coupled clutch 06. The shaft 05 and a pulley input shaft 08 are disconnectably connected to each other by a neutral clutch 07.

Further, a stator 10 is interposed between a pump runner and a turbine runner via a stator connector member 12 provided on a shaft 11, and a brake 13 is interposed between the other end of the shaft 11 and a casing 09.

Problems of the torque converter described above will be examined here.

(1) Characteristics upon Starting

For a fluid coupling such as a torque converter, a stall matching characteristic of an engine makes a significant factor on the fuel cost, the acceleration, and the feeling upon starting. In addition, the stall matching characteristic of an engine is expressed by the rotational speed of the engine in such a state that the accelerator pedal is operated fully when a turbine connected to the output of the fluid coupling, that is, the vehicle is in a stopping state.

In such a torque converter as shown in FIG. 5, upon starting for forward running, the stator 10 idles at a speed substantially equal to the speed of the pump 03 connected to the engine, and thereby the pump 03 does not disturb a flow of fluid to the turbine 04. However, upon starting for backward running, since the stator 10 is fixed, the pump 03 disturbs a flow of the torque transmitting fluid, and consequently, the flow rate of the torque transmitting fluid is decreased. Consequently, the capacity of the pump is decreased, and the speed of the engine becomes higher than that upon forward running.

Usually, since a torque converter is designed so as to assure a good stall matching characteristic for starting for forward running, the starting characteristic upon backward running is degraded resultantly.

(2) Position of Stator in Torque Converter

If the stator 10 is designed so that it is positioned on the outer peripheries of the pump 03 and the turbine 04 in such a manner as to cover over them, then it has significantly bad effects on the cost and the performance.

In particular, where the structure just described is employed, since the stator 10 is positioned on the outer peripheries of the pump 03 and the turbine 04, if it is intended to obtain a same torque capacity (as that, for example, achieved by a torque converter to which the present invention is applied), then the outer diameter of the torque converter is increased by the stator 10, resulting in the increased cost. Since also the stator 10 itself is naturally positioned on the outer periphery of the torque converter, it is increased in size and hence in cost.

Accordingly, in most automobiles at present, the position of a stator is selected on the inner periphery sides of a pump and a turbine.

Further, the stator connector member 12 for interconnecting the stator runner to the brake 13 must extend across flow paths of the pump 03 and the turbine 04. Since the stator runner is applied with a thrust force in an axial direction by the fluid, the crossing portions of the stator connector member 12 must have a sufficient strength. Further, although each of the crossing portions of the stator connector member 12 has a hole, the formation of the hole disturbs a flow of fluid in the inside of the torque converter and gives rise to a disadvantage that the torque capacity is decreased.

SUMMARY OF THE INVENTION

It is an object of the present invention to provide a continuously variable transmission which is compact and high in operation efficiency.

In order to attain the object described above, according to the present invention, there is provided a continuously variable transmission which includes a torque converter which in turn includes at least three runners of an impeller, a first turbine and a second turbine, comprising a lock-up clutch operable to couple the impeller and the first turbine to each other, a hydraulic brake disposed on a first turbine shaft connected to the first turbine and capable of being fixed to a housing, the second turbine being connected to a second turbine shaft connected to a pulley of a transmission via a one-way clutch which transmits a force only when the second turbine rotates in a direction reversed to the direction of rotation of the impeller, and a hydraulic clutch operable to couple the first turbine shaft and the second turbine shaft to each other.

In the continuously variable transmission, the impeller and the first turbine can be disposed in an opposing relationship to each other on the outer periphery side of the torque converter while the second turbine can be disposed on the inner periphery side of the torque converter between the impeller and the first turbine. As a result, the continuously variable transmission has a structure which can be produced at a reduced cost. Also with regard to the performance, since the first turbine and the second turbine, which correspond to the stator and the turbine in such a continuously variable transmission as described hereinabove with reference to FIG. 5, respectively, are held stopped upon starting for forward running as well as upon starting for backward running so that a same flow of operating fluid may be exhibited both upon starting for forward running and upon starting for backward running, an engine to which the continuously variable transmission is connected exhibits a same stall matching characteristic in both cases. Consequently, smooth change-over between forward running and backward running can be achieved.

Further, with the continuously variable transmission, since gears for forward and backward running of an ordinary continuously variable transmission are eliminated, the entire continuously variable transmission can be formed compact and at a reduced cost. Additionally, since engine torque is transmitted via the fluid coupling and the hydraulic clutch and brake, smooth starting can be achieved.

The above and other objects, features and advantages of the present invention will become apparent from the following description and the appended claims, taken in conjunction with the accompanying drawings in which like parts or elements are denoted by like reference characters.

DESCRIPTION OF THE PREFERRED EMBODIMENTS

Figure 1:
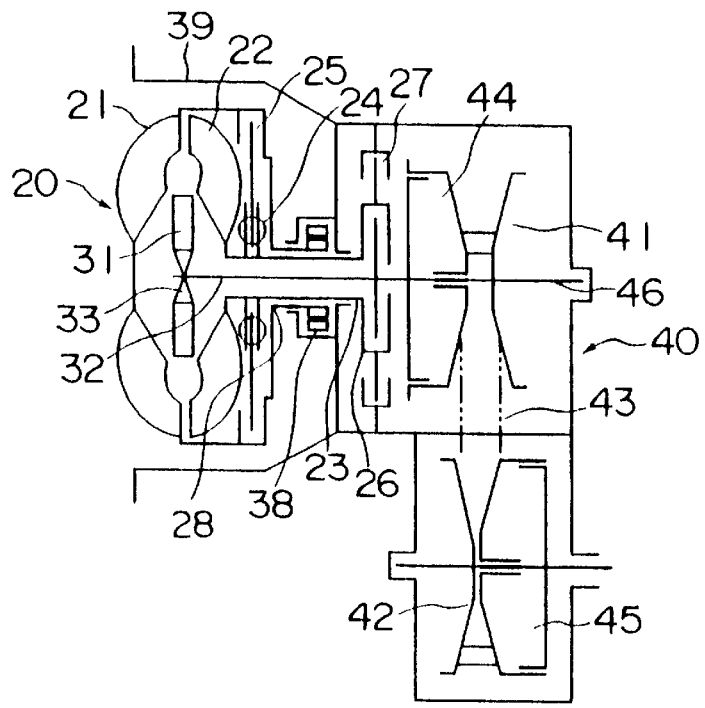
FIG. 1 is a schematic view of a continuously variable transmission showing a first preferred embodiment of the present invention.

FIG. 1 shows a continuously variable transmission according to a first preferred embodiment of the present invention which includes a torque converter which in turn includes three components of an impeller, a first turbine and a second turbine.

Referring to FIG. 1, the torque converter is generally denoted at 20. An impeller 21 which is connected to and driven by a crankshaft of an internal combustion engine and a first turbine 22 coupled to a first turbine shaft 23 are connected to each other through a damper 24 and a lock-up clutch 25 interposed therebetween. Further, the first turbine shaft 23 is connected on its transmission side to a hydraulic clutch 26, and a disk of a hydraulic brake 27 is connected to a cover of the hydraulic clutch 26. The first turbine shaft 23 is supported fixedly or for relative movement on a housing 39 by the hydraulic brake 27.

A second turbine 31 is supported on a second turbine shaft 32 via a one-way clutch 33 which transmits torque when the second turbine 31 rotates in a direction reversed to that of the impeller 21. A disk of the hydraulic clutch 26 is fixed to an end of the second turbine shaft 32 on the transmission side, and is further coupled to a shaft 46 of a pair of first pulleys 41 of a belt type continuously variable transmission mechanism 40.

The belt type continuously variable transmission mechanism 40 itself has a usual construction, in which a belt 43 is wound around the first pulleys 41 and a pair of second pulleys 42. Further, hydraulic cylinders 44 and 45 are provided on those on one side of the first pulleys 41 and the second pulleys 42.

It is to be noted that reference numeral 38 in FIG. 1 denotes an oil pump which is driven by a shaft 28 connected to the impeller 21. The oil pump 38 supplies hydraulic oil to the torque converter 20, hydraulic clutch 26, hydraulic brake 27, hydraulic cylinders 44 and 45, and so forth.

Figure 2:
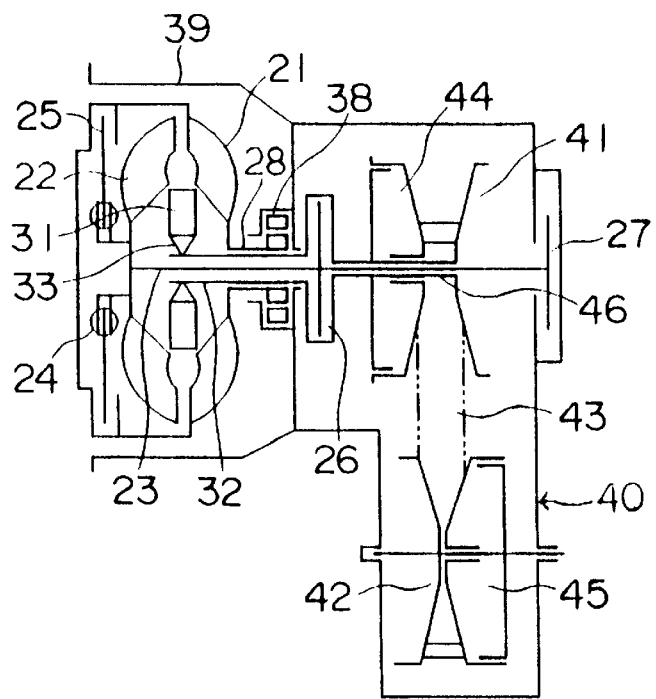
FIG. 2 is a similar view but showing a second preferred embodiment of the present invention which is different in position of an impeller and a first turbine from the continuously variable transmission shown in FIG. 1.

FIG. 2 shows a continuously variable transmission according to a second preferred embodiment of the present invention. Referring to FIG. 2, the continuously variable transmission shown is a modification to but different from the continuously variable transmission of FIG. 1 in that the impeller 21 and the first turbine 22 are arranged in the opposite positional relationship in the axial direction of the continuously variable transmission to that in the continuously variable transmission of FIG. 1. Accordingly, also the hydraulic brake 27 is located at a different position.

In particular, in the continuously variable transmission of FIG. 2, the crankshaft of the internal combustion engine is connected to the impeller 21 positioned nearer to the transmission side than the first turbine 22, and the impeller 21 is connected to the shaft 28 and drives the oil pump 38. Further, the first turbine 22 is coupled to the first turbine shaft 23 and can be connected to the impeller 21 via the damper 24 and the lock-up clutch 25 similarly as in the continuously variable transmission of FIG. 1.

The second turbine 31 is connected to the second turbine shaft 32 via the one-way clutch 33, and the second turbine shaft 32 and the first turbine shaft 23 can be disconnectably connected to each other by the hydraulic clutch 26.

Also in this instance, the shaft 46 which drives the first pulleys 41 of the transmission 40 is coupled to the second turbine shaft 32 and drives the second pulleys 42 to rotate via the belt 43.

Here, the hydraulic brake 27 for fixing the first turbine shaft 23 is provided on an outer side of a rear end of the housing of the belt type continuously variable transmission mechanism 40.

Figure 3:
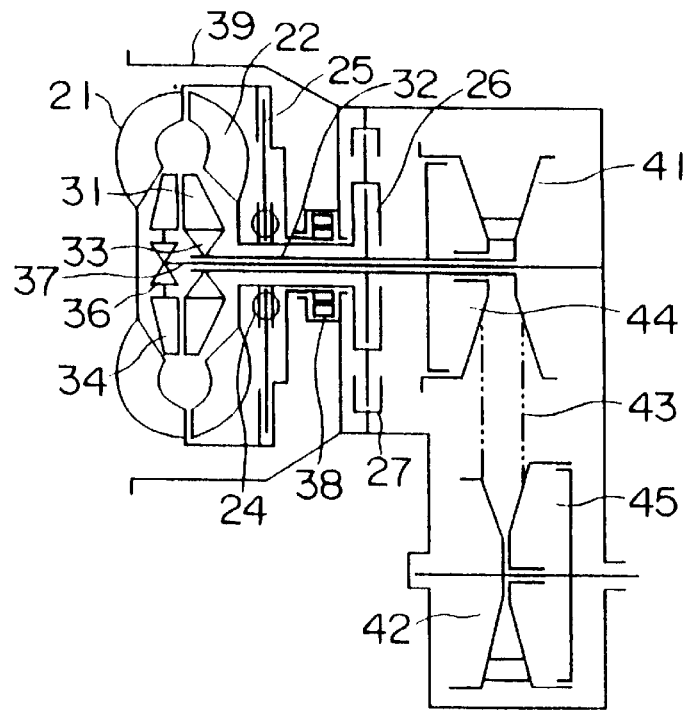
FIG. 3 is a similar view but showing a third preferred embodiment of the present invention which is different from the continuously variable transmission shown in FIG. 1 in that a stator is disposed via a second one-way clutch.

FIG. 3 shows a continuously variable transmission according to a third preferred embodiment of the present invention. The continuously variable transmission is a modification to but different from the continuously variable transmission of the first embodiment shown in FIG. 1 in that a stator 34 is interposed between the impeller 21 and the second turbine 31 via a second one-way clutch 36 which is fixed to a fixed shaft 37 connected to the housing when it rotates in a direction reversed to that of the impeller 21.

The second turbine 31 is connected to the second turbine shaft 32 via the one-way clutch 33 so that one of the first pulleys 41 which is an input side pulley is driven by the second turbine shaft 32. Similarly, the hydraulic clutch 26 is connected to the second turbine shaft 32, and the disk of the hydraulic clutch 26 can be fixed to the hydraulic brake 27.

In the present embodiment, since the stator 34 is fixed to the hydraulic brake 27 via the second one-way clutch 36, a flow of oil from the impeller 21 is changed in direction so as to flow in the same direction as the direction of rotation of the impeller 21 by the stator 34 so that the oil transmits amplified torque to the first and second turbines which are fixed by the hydraulic clutch 26.

Figure 4:
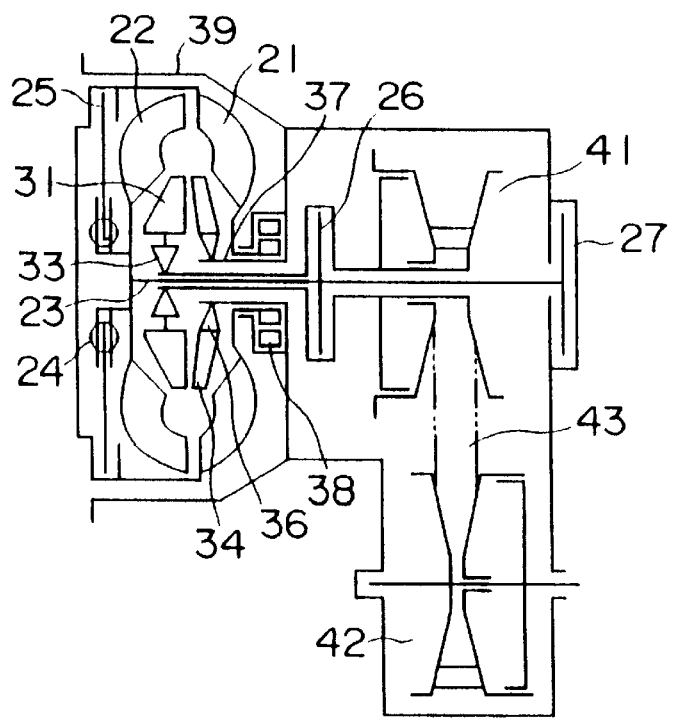
FIG. 4 is a similar view but showing a fourth preferred embodiment of the present invention which is different from the continuously variable transmission shown in FIG. 2 in that a stator is disposed via a second one-way clutch.
Figure 5:
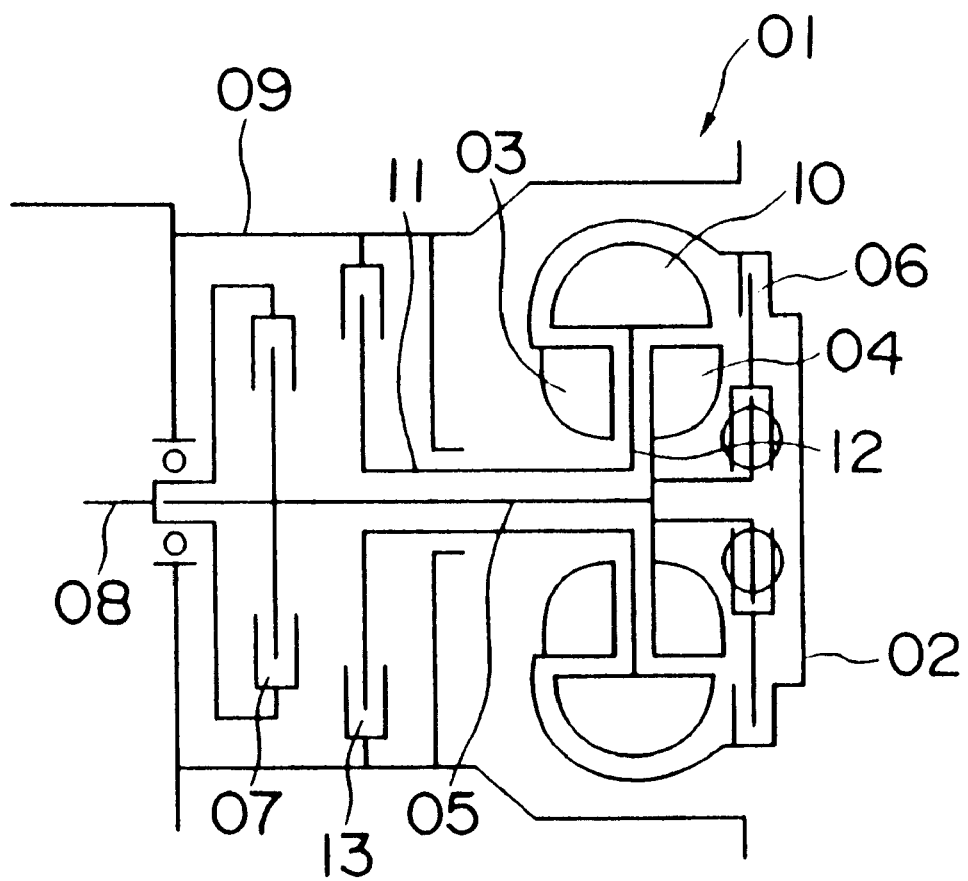
FIG. 5 is a schematic view of a torque converter of a known transmission.

FIG. 4 shows a continuously variable transmission according to a fourth preferred embodiment of the present invention. The continuously variable transmission is a modification to but different from the continuously variable transmission of the first embodiment shown in FIG. 2 in that the stator 34 is interposed between the impeller 21 and the second turbine 31 via the second one-way clutch 36 which is fixed to the fixed shaft 37 connected to the housing when it rotates in a direction reversed to that of the impeller 21, similarly as in the continuously variable transmission of the third embodiment shown in FIG. 3.

Thus, since the stator 34 is supported on the fixed shaft 37, oil from the impeller 21 is changed, after it passes through the first and second turbines, in flowing direction by the stator 34 so that it flows in the same direction as that of rotation of the impeller 21. Consequently, a higher driving force can be obtained.

Figure 6:
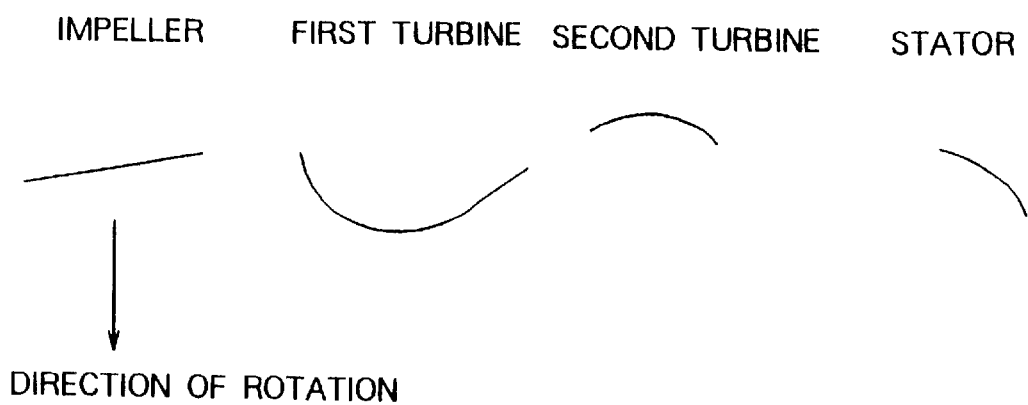
FIG. 6 is a schematic illustration showing shapes of a blade of runners of an impeller, a first turbine, a second turbine and a stator.

FIG. 6 schematically shows shapes of a blade of the impeller, first turbine, second turbine and stator. Operation of the torque converter of the continuously variable transmission of the present invention in various operation states will be described below.

It is to be noted that Table 1 below indicates operation conditions of the coupling elements in various running states.

TABLE 1

|  | 1st OWC | (2nd OWC) | Lock-up Clutch | Hydr. Clutch | Hydr. Clutch |
|---|---|---|---|---|---|
| Neutral | — | — | — | — | — |
| Forward |  |  |  |  |  |
| Upon start | ○ | (○) | — | ○ | — |
| After start | — | — | ○ | ○ | — |
| Backward | ○ | (○) | — | — | ○ |

Neutral Condition

All coupling elements are off, and the first turbine 22 is connected to no element and the second turbine 31 is in a released state in the same direction as that of the impeller 21 because the first OWC (one-way clutch 33) idles in the direction. Consequently, the impeller 21 and the first turbine 22 and first turbine shaft 23 rotate in the same direction and consequently are in an idling state wherein no force is transmitted between them.

It is to be noted that, where the stator 34 is provided, it idles in the same direction.

Starting for Forward Running

The first turbine 22 and the second turbine 31 are connected to each other by the hydraulic clutch 26 and thus operate integrally with each other. The first turbine 22 and the second turbine 31 in this state are applied with a turning force in the same direction as that of the impeller 21 by oil discharged from the impeller 21. The turning force is inputted to the first pulleys 41. In the torque converters shown in FIGS. 1 and 2 which do not include a stator, the turbines 22 and 31 operating integrally with each other are applied with the same torque as that applied upon the impeller 21. However, in the torque converters shown in FIGS. 3 and 4, the stator 34 is fixed by the second OWC (second one-way clutch 36) and oil flows in the direction of rotation of the impeller 21 and decreases the torque applied to the impeller 21. As a result, the turbine torque is increased by the impeller torque, and consequently, a higher starting force can be obtained.

Forward Running after Started

Since the lock-up clutch 25 is connected, a torque of the internal combustion engine is transmitted directly to the first turbine shaft 23 and then transmitted to the first pulleys 41 via the hydraulic clutch 26. In this state, the first and second turbines connected to the impeller rotate integrally and no oil flows. Consequently, transmission by oil does not occur.

Backward Running

Since the first turbine 22 is fixed by the hydraulic brake 27 and the second turbine 31 has blades so shaped that a turning force in the reversed direction is received from the first turbine 22, the impeller 21 is applied with a force in a direction reversed to that of the impeller 21 by the oil. This reversed turning force is inputted to the first pulley shaft via the first OWC (one-way clutch 33). By the shape of the blades, the reversed turning force of the second turbine 31 can be increased comparing with the forward turning force of the impeller 21.

It is to be noted that, where the stator 34 is provided, when the speed of the reversed rotation increases, similar effects to those upon starting for forward running are exhibited, and increased torque of the impeller can be transmitted to the second turbine.

Having now fully described the invention, it will be apparent to one of ordinary skill in the art that many changes and modifications can be made thereto without departing from the spirit and scope of the invention as set forth herein.

What is claimed is:

1. A continuously variable transmission which includes a torque converter which in turn includes at least three runners of an impeller, a first turbine and a second turbine, comprising:

a lock-up clutch operable to couple said impeller and said first turbine to each other;

a hydraulic brake disposed on a first turbine shaft connected to said first turbine and capable of being fixed to a housing;

said second turbine being connected to a second turbine shaft connected to a pulley of a transmission via a one-way clutch which transmits a force only when said second turbine rotates in a direction reversed to the direction of rotation of said impeller; and a hydraulic clutch operable to couple said first turbine shaft and said second turbine shaft to each other.

2. A continuously variable transmission according to claim 1, wherein said impeller is disposed adjacent an internal combustion engine side while said first turbine is disposed adjacent said transmission side and said second turbine is disposed intermediately between said impeller and said first turbine, and said hydraulic brake has a cover which can be fixed to said housing.

3. A continuously variable transmission according to claim 2, further comprising a second one-way clutch which is fixed to a fixed shaft connected to said housing when said second one-way clutch rotates in a direction reversed to the direction of rotation of said impeller, and a stator disposed between said impeller and said second turbine via said second one-way clutch.

4. A continuously variable transmission according to claim 1, wherein said impeller is disposed adjacent said transmission while said first turbine is disposed adjacent said internal combustion engine and said second turbine is disposed intermediately between said impeller and said first turbine, and said hydraulic brake to which said first turbine shaft can be fixed is disposed rearwardly of said housing.

5. A continuously variable transmission according to claim 4, further comprising a second one-way clutch which is fixed to a fixed shaft connected to said housing when said second one-way clutch rotates in a direction reversed to the direction of rotation of said impeller, and a stator disposed between said impeller and said second turbine via said second one-way clutch.

6. A continuously variable transmission according to claim 1, further comprising a second one-way clutch which is fixed to a fixed shaft connected to said housing when said second one-way clutch rotates in a direction reversed to the direction of rotation of said impeller, and a stator disposed between said impeller and said second turbine via said second one-way clutch.

* * * * *